United States Patent
Hama et al.

(10) Patent No.: US 9,131,089 B2
(45) Date of Patent: Sep. 8, 2015

(54) IMAGE PROCESSING SYSTEM INCLUDING IMAGE FORMING APPARATUS HAVING TOUCH PANEL

(75) Inventors: Kenro Hama, Amagasaki (JP); Katsuhiko Akita, Amagasaki (JP); Shoji Imaizumi, Shinshiro (JP); Hiroki Tajima, Amagasaki (JP); Yuji Okamoto, Amagasaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 507 days.

(21) Appl. No.: 13/477,094

(22) Filed: May 22, 2012

(65) Prior Publication Data

US 2012/0300247 A1 Nov. 29, 2012

(30) Foreign Application Priority Data

May 23, 2011 (JP) ................................ 2011-114412

(51) Int. Cl.
| | | |
|---|---|---|
| H04N 1/00 | (2006.01) | |
| H04N 1/44 | (2006.01) | |
| G06F 17/30 | (2006.01) | |
| G06F 3/12 | (2006.01) | |
| G06K 15/02 | (2006.01) | |

(52) U.S. Cl.
CPC ...... *H04N 1/00461* (2013.01); *G06F 17/30103* (2013.01); *H04N 1/00127* (2013.01); *H04N 1/00204* (2013.01); *H04N 1/00347* (2013.01); *H04N 1/00411* (2013.01); *H04N 1/00424* (2013.01); *H04N 1/4426* (2013.01); *H04N 2201/0039* (2013.01); *H04N 2201/0094* (2013.01); *H04N 2201/0096* (2013.01)

(58) Field of Classification Search
CPC .................................................. G06F 17/30103
See application file for complete search history.

(56) References Cited

U.S. PATENT DOCUMENTS

| | | |
|---|---|---|
| 2005/0060379 A1 | 3/2005 | Torii |
| 2006/0025218 A1 | 2/2006 | Hotta |
| 2006/0101008 A1* | 5/2006 | Asai et al. .................. 707/3 |

(Continued)

FOREIGN PATENT DOCUMENTS

| | | |
|---|---|---|
| CN | 1155819 A | 7/1997 |
| CN | 101753765 A | 6/2010 |

(Continued)

OTHER PUBLICATIONS

Chinese Office Action dated May 6, 2014 issued in corresponding Chinese Patent Appln. No. 201210160496. X with English translation (19 pages).

(Continued)

*Primary Examiner* — Beniyam Menberu
(74) *Attorney, Agent, or Firm* — Buchanan Ingersoll & Rooney PC

(57) ABSTRACT

A first terminal device indicates a file based on a first gesture on a touch panel, and upon receipt of a search instruction by a second gesture on the touch panel, transmits search information including the indicated file and user information to an image processing device. The image processing device stores the search information. A second terminal device obtains search information from the image processing device, executes a search operation using the search information, and transmits information that identifies retrieved data to the first terminal device as a search result.

15 Claims, 15 Drawing Sheets

(56) References Cited

U.S. PATENT DOCUMENTS

| | | | |
|---|---|---|---|
| 2006/0122986 A1* | 6/2006 | Sohma | 707/3 |
| 2006/0200596 A1* | 9/2006 | So | 710/38 |
| 2007/0050472 A1* | 3/2007 | Cha | 709/217 |
| 2008/0140780 A1 | 6/2008 | Hopkins et al. | |
| 2008/0220748 A1* | 9/2008 | Park | 455/414.1 |
| 2011/0125735 A1* | 5/2011 | Petrou | 707/723 |
| 2011/0196864 A1* | 8/2011 | Mason et al. | 707/728 |
| 2012/0109940 A1* | 5/2012 | Ishii et al. | 707/722 |

FOREIGN PATENT DOCUMENTS

| | | | |
|---|---|---|---|
| JP | 2002-304256 A | 10/2002 | |
| JP | 2004-178018 A | 6/2004 | |
| JP | 2005-234878 A | 9/2005 | |
| JP | 2006-034754 A | 2/2006 | |
| JP | 2006-184957 A | 7/2006 | |
| JP | 2006-276952 * | 10/2006 | G06F 13/00 |
| JP | 2009-151773 A | 7/2009 | |
| JP | 2010-509674 A | 3/2010 | |

OTHER PUBLICATIONS

Office Action (Notice of Grounds of Rejection) dated Apr. 2, 2013, issued by the Japanese Patent Office in corresponding Japanese Patent Application No. 2011-114412, and an English translation thereof. (7 pages).

* cited by examiner

IMAGE PROCESSING SYSTEM INCLUDING IMAGE FORMING APPARATUS HAVING TOUCH PANEL

This application is based on Japanese Patent Application No. 2011-114412 filed with the Japan Patent Office on May 23, 2011, the entire content of which is hereby incorporated by reference.

BACKGROUND OF THE INVENTION

1. Field of the Invention

The present invention relates to an image processing system, an image forming apparatus and a terminal device, and more particularly to an image processing system, an image forming apparatus and a terminal device in which operations are executed by user's "pinch-in (pinch-close)" and "pinch-out (pinch-open)" gestures on a touch panel.

2. Description of the Related Art

In an office environment, a network is used in a manner that a plurality of information processing devices are connected together and information is stored in one of the devices (server or the like).

In this case, when a certain information processing device needs information, that device connects to the server or the like having information stored therein to search for the necessary information in that server. Such a technique is disclosed in Japanese Laid-Open Patent Publication No. 2004-178018, for example.

At this time, usually, an application is executed in one's own PC for causing a search to be executed, and further, a search command is transmitted to the server to cause a search operation to be executed in the server.

In order to cause such an operation to be executed as disclosed in the above-mentioned publication, first of all, an operation of setting a search condition in one's own PC, and then accessing the server to provide an instruction for causing the server to execute a search operation under that search condition is required, which may complicate the operation.

Moreover, with such processing being executed, loads are applied to all of the device having instructed the search operation, the server and the network, so that the entire network is degraded in performance.

SUMMARY OF THE INVENTION

The present invention was made in view of such problems, and has an object to provide an image processing system, an image processing device, a terminal device, and a control program that enables a search operation to be executed in a network environment with easy intuitive manipulations, while preventing the network from being degraded in performance.

To achieve the above-described object, according to an aspect of the present invention, an image processing system includes a plurality of terminal devices and an image processing device. A first terminal device among the plurality of terminal devices includes a touch panel and a controller connected to the touch panel, indicates a file based on a first gesture on the touch panel, and upon receipt of a search instruction by a second gesture on the touch panel, transmits search information including the file and user information to the image processing device. The image processing device stores the search information. A second terminal device among the plurality of terminal devices obtains the search information from the image processing device, executes a search operation using the search information, and transmits information that identifies data retrieved by the search operation to the first terminal device as a search result.

Preferably, the second terminal device transmits user information to the image processing device, and when user authentication based on the user information included in the search information from the first terminal device and the user information from the second terminal device succeeds, the image processing device transmits the search information to the second terminal device.

More preferably, when the user authentication succeeds within a predetermined period after receiving the search information from the first terminal device, the image processing device transmits the search information to the second terminal device.

Preferably, the image processing device makes a report on a result of the user authentication to the second terminal device, the second terminal device sends a request for the search information from the image processing device by receiving an operation of instructing execution of the search operation in accordance with the report, and the image processing device transmits the search information to the second terminal device in accordance with the request.

More preferably, when the request is received from the second terminal device within a predetermined period after receiving the search information from the first terminal device or after success in the user authentication, the image processing device transmits the search information to the second terminal device.

Preferably, the first terminal device sets a search condition, and transmits the search information including the search condition to the image processing device.

Preferably, the image processing device stores a search condition for each user, and transmits, to the second terminal device, the search information from the first terminal device and the search condition in accordance with the user information included in the search information, in response to a request from the second terminal device.

Preferably, one of the first gesture and the second gesture on the touch panel is a gesture of, continuously after two contacts are made on the touch panel, moving the two contacts in a direction that a spacing therebetween is decreased and then releasing the two contacts after being moved, and the other one is a gesture of, continuously after two contacts are made on the touch panel, moving the two contacts in a direction that the spacing therebetween is increased and then releasing the two contacts after being moved.

According to another aspect of the present invention, an image processing device capable of communicating with a first terminal device and a second terminal device, includes a communication unit for communicating with the first terminal device and the second terminal device, a memory, and a controller. The controller executes the processes of storing search information received from the first terminal device in the memory, conducting user authentication using user information received from the second terminal device and the search information, and transmitting the search information to the second terminal device when the user authentication succeeds.

Preferably, the memory stores a search condition for each user, the search information includes user information indicated in the first terminal device, and in the process of transmitting the search information to the second terminal device, the controller transmits the search condition to the second terminal device in accordance with the user information included in the search information stored in the memory.

Preferably, when the user authentication succeeds within a predetermined period after receiving the search information from the first terminal device, the controller transmits the search information to the second terminal device.

Preferably, the controller executes the process of making a report on a result of the user authentication to the second terminal device before the process of transmitting the search information to the second terminal device, and upon receipt of a request for the search information from the second terminal device by the second terminal device having received an operation of indicating execution of a search operation from a user in accordance with the report, the controller transmits the search information to the second terminal device in accordance with the request.

More preferably, when the request is received from the second terminal device within a predetermined period after receiving the search information from the first terminal device or after success in the user authentication, the controller transmits the search information to the second terminal device.

According to still another aspect of the present invention, a terminal device includes a touch panel and a controller connected to the touch panel. The controller executes the processes of indicating a file based on a first gesture on the touch panel, upon receipt of a search instruction by a second gesture on the touch panel, transmitting search information at least including the name of the file and user information to an other device, making a report to the other device when a predetermined gesture is performed on the touch panel, and executing a search operation using the search information received from the other device, and transmitting, as a search result, information that identifies data retrieved by the search operation to a device identified by the search information.

Preferably, one of the first gesture and the second gesture on the touch panel is a gesture of, continuously after two contacts are made on the touch panel, moving the two contacts in a direction that a spacing therebetween is decreased and then releasing the two contacts after being moved, and the other one is a gesture of, continuously after two contacts are made on the touch panel, moving the two contacts in a direction that the spacing therebetween is increased and then releasing the two contacts after being moved.

According to still another aspect of the present invention, a non-transitory computer-readable storage medium has stored thereon a program for causing an image processing device having a controller to execute a control operation. The image processing device is capable of communicating with a first terminal device and a second terminal device, each including a touch panel. The program instructs the controller to perform the following steps of conducting user authentication using user information received from the second terminal device and search information received from the first terminal device, and transmitting the search information to the second terminal device when the user authentication succeeds.

According to still another aspect of the present invention, a non-transitory computer-readable storage medium has stored thereon a program for causing a terminal device having a touch panel and a controller connected to the touch panel to execute a search operation. The program instructs the controller to perform the following steps of making a report to an other device when a predetermined gesture is performed on the touch panel, executing the search operation using search information received from the other device, and transmitting, as a search result, information that identifies data retrieved by the search operation to a device identified by the search information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
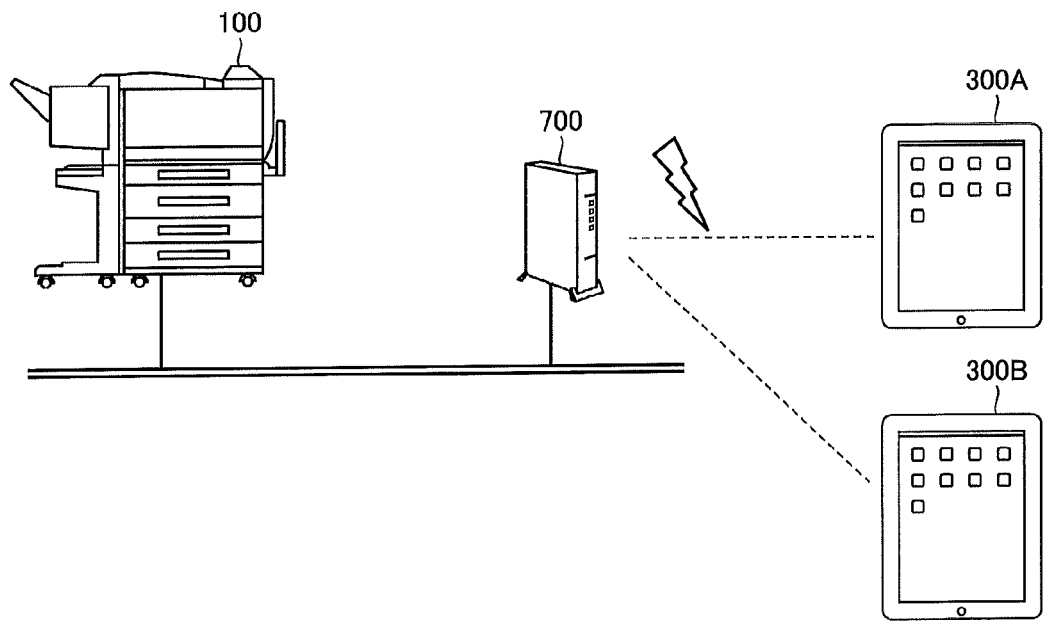
FIG. 1 shows a specific example of a configuration of an image forming system according to an embodiment.

Hereinafter, embodiments of the present invention will be described with reference to the drawings. In the following description, like parts and components are denoted by like reference characters. They are named and function identically as well.

<System Configuration>

FIG. 1 shows a specific example of a configuration of an image forming system according to the present embodiment.

Referring to FIG. 1, the image forming system according to the present embodiment includes an MFP (Multi-Functional Peripheral) 100 as an example of an image forming apparatus, functioning as a server as well, and a portable terminal 300 as a terminal device. They are connected through a network, such as LAN (Local Area Network). A plurality of portable terminals 300A and 300B are included in the image processing system, and are representatively referred to as a portable terminal 300.

The network may be wired or may be wireless. As an example, as shown in FIG. 1, a wired LAN further includes a wireless LAN access point 700, and portable terminal 300 is connected to wireless LAN access point 700 through the wireless LAN.

<Configuration of MFP>

Figure 2:
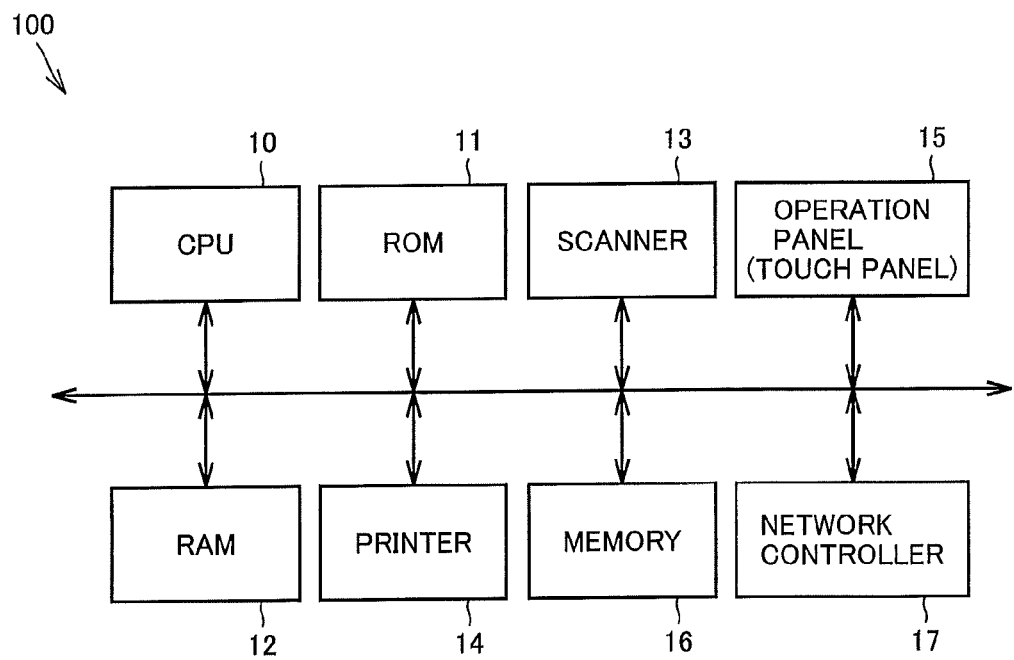
FIG. 2 shows a specific example of a hardware configuration of MFP (Multi-Functional Peripheral) included in the image forming system.

FIG. 2 shows a specific example of a hardware configuration of MFP 100.

Referring to FIG. 2, MFP 100 includes a CPU (Central Processing Unit) 10 as an arithmetic device for overall control, a ROM (Read Only Memory) 11 for storing programs and the like to be executed by CPU 10, a RAM (Random Access Memory) 12 for functioning as a working area during execution of a program by CPU 10, a scanner 13 for optically reading a document placed on a document table not shown to obtain image data, a printer 14 for fixing image data on a printing paper, an operation panel 15 including a touch panel for displaying information and receiving an operation input to MFP 100 concerned, a memory 16 for storing image data as a file, and a network controller 17 for controlling communications through the above-described network.

Operation panel 15 includes the touch panel and an operation key group not shown. The touch panel is composed of a display device such as a liquid crystal display and a pointing device such as an optical touch panel or a capacitance touch panel, the display device and the pointing device overlapping each other, and displays an operation screen so that an indicated position on the operation screen is identified. CPU 10 causes the touch panel to display the operation screen based on data stored previously for causing screen display.

The indicated position (position of touch) on the touch panel as identified and an operation signal indicating a pressed key are input to CPU 10. CPU 10 identifies details of manipulation based on the pressed key or the operation screen being displayed and the indicated position, and executes a process based thereon.

<Configuration of Portable Terminal>

Figure 3:
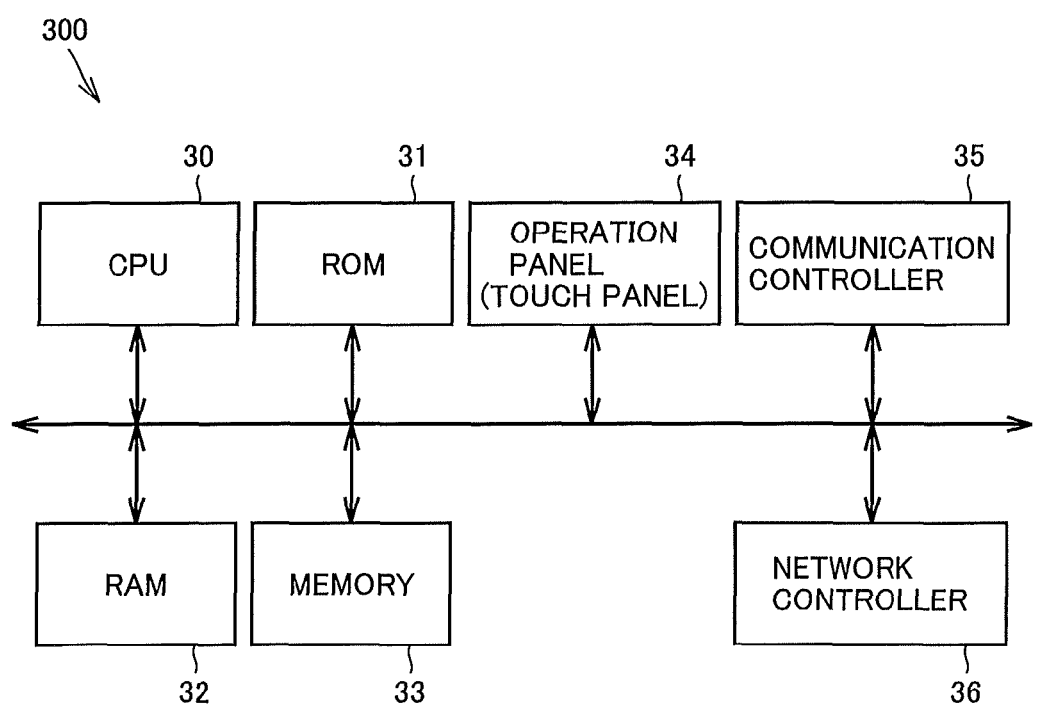
FIG. 3 shows a specific example of a hardware configuration of a portable terminal included in the image forming system.

FIG. 3 shows a specific example of a hardware configuration of portable terminal 300.

Referring to FIG. 3, portable terminal 300 includes a CPU 30 as an arithmetic device for overall control, a ROM 31 for storing programs and the like to be executed by CPU 30, a RAM 32 for functioning as a working area during execution of a program by CPU 30, a memory 33 for storing image data as a file and storing another type of information, an operation panel 34 including a touch panel for displaying information and receiving an operation input to portable terminal 300 concerned, a communication controller 35 for controlling communications through telephone lines by communicating with a base station not shown, and a network controller 36 for controlling communications through the above-described network.

Operation panel 34 may have a configuration similar to that of operation panel 15 of MFP 100. That is, as an example, operation panel 34 includes a touch panel composed of a display device such as a liquid crystal display and a pointing device such as an optical touch panel or a capacitance touch panel, the display device and the pointing device overlapping each other.

CPU 30 causes the touch panel to display an operation screen based on data stored previously for causing screen display. On the touch panel, the indicated position on the operation screen is identified, and an operation signal indicating that position is input to CPU 30. CPU 30 identifies details of manipulation based on the operation screen being displayed and the indicated position, and executes a process based thereon.

<Outline of Operations>

Figure 4:
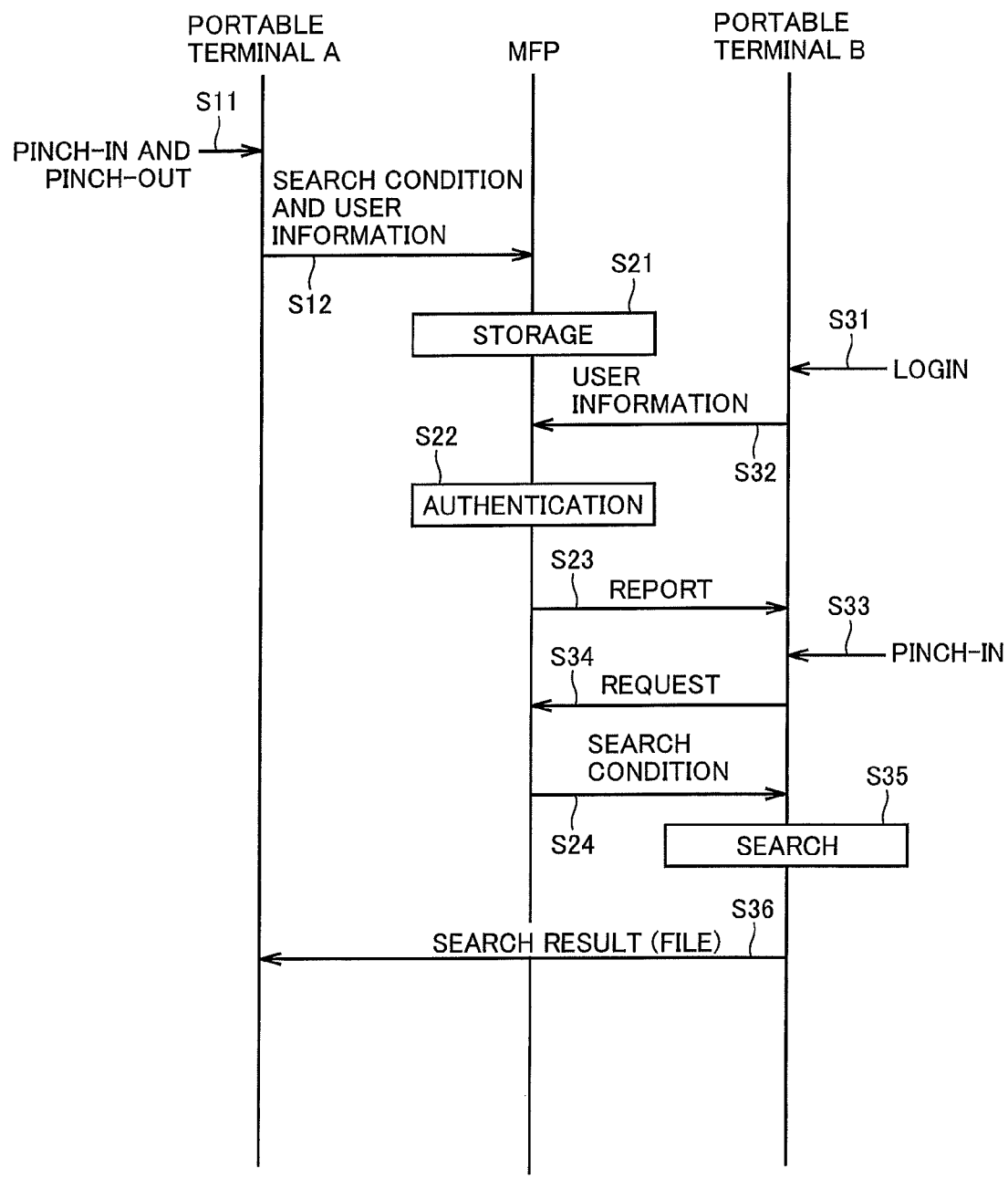
FIG. 4 shows the outline of operations in the image processing system.
Figure 5:
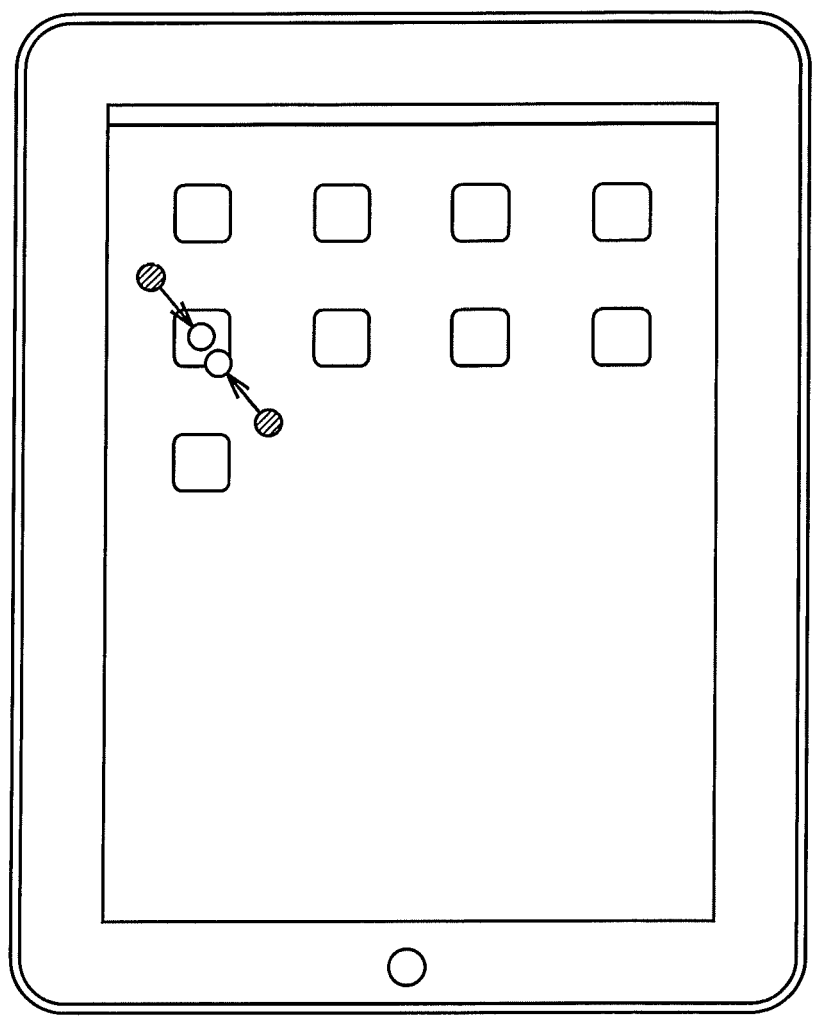
FIG. 5 illustrates a gesture on a screen of the portable terminal.

FIG. 4 shows the outline of operations in the file processing system according to the present embodiment. FIG. 5 illustrates a gesture on a screen of portable terminal 300.

Referring to FIG. 4, in the case where a screen including an icon of a file is displayed on operation panel 34 of portable terminal 300A as a first portable terminal, and when a gesture of pinching in the icon presenting the file is detected as shown in FIG. 5, and a gesture of pinching out on the icon for instructing a search to be described later is further detected (Step S11), a file name subjected to the pinch-in gesture and the like, as well as user information which is information on a user (e.g., login user, etc.) associated with portable terminal 300A are transmitted as search information from portable terminal 300A to MFP 100 functioning as the server (Step S12). At this time, if another search condition has been set, that search condition is also transmitted to MFP 100 as search information.

Upon receipt of this search information, MFP 100 stores the information in a predetermined region of memory 16 (Step S21).

If a login operation is then performed on portable terminal 300B as a second portable terminal (Step S31), user information on the login user is transmitted to MFP 100 (Step S32).

Upon receipt of the user information transmitted following the login operation, MFP 100 authenticates the received user information using the user information included in the search information stored in above-described step S21 (Step S22). An example in which authentication is determined successful when the users are identical is illustrated here by way of example, but as another example, in the case where a user permitted to conduct a search is identified in the search condition included in the search information, authentication is determined successful when the received user information agrees with that user permitted to conduct the search. As still another example, in the case where a group (department, section, etc.) to which the user belongs is identified in the search condition, authentication is determined successful when in agreement with the group to which the user belongs in the received user information.

In the case where authentication succeeds in the above-described step S22, MFP 100 reports to that effect to portable terminal 300B in which the login operation has been performed (Step S23). It is noted that an error may be reported here when authentication does not succeed.

Figure 19:
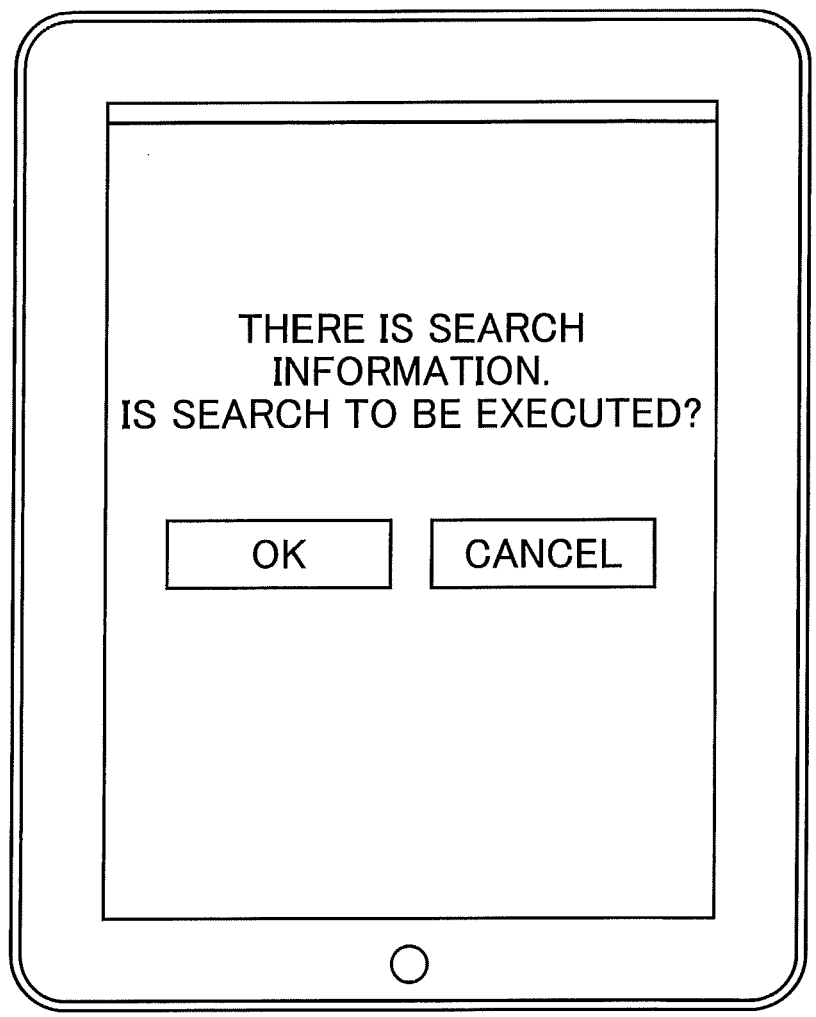
FIG. 19 shows a specific example of a report screen.

Portable terminal 300B having received the report in the above-described step S23 displays a screen which inquires whether a search is permitted or not (FIG. 19). When input that permits a search is made on the screen or when a pinch-in gesture or the like is detected (Step S33), portable terminal 300B requests search information to MFP 100 (Step S34).

It is noted that, when it has been found previously that a search is to be permitted, such as in the case of an identical user, for example, the above-described steps S23 to S33 may be skipped.

MFP 100 transmits the search condition included in the search information stored in Step S21 to portable terminal 300B in response to the request in the above-described step S34 (Step S24).

Upon receipt of the information transmitted in the above-described step S24, portable terminal 300B executes a search operation in accordance with the search condition (Step S35). Then, the search result is transmitted to portable terminal 300A (Step S36).

In the above-described step S36, when a plurality of files are retrieved, for example, those files themselves are not transmitted, but only information that can identify those files, such as the file name and the file attribute, is transmitted to portable terminal 300A as the search result.

Portable terminal 300A having received the search result may display a table, for example, thereby accepting an operation of indicating a necessary file, and accordingly may require the indicated file from portable terminal 300B.

Figure 6:
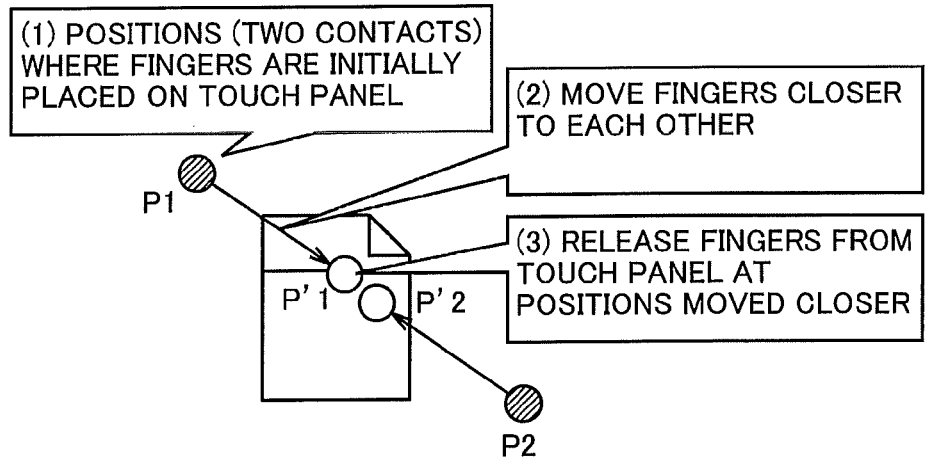
FIG. 6 illustrates a pinch-in gesture.

It is noted that FIG. 6 illustrates a "pinch-in" gesture. Referring to FIG. 6, the "pinch-in" or pinching gesture refers to a motion of making two contacts P1 and P2 on the operation panel using, for example, two fingers or the like, and then moving the fingers closer to each other from their initial positions linearly or substantially linearly, and releasing the two fingers from the operation panel at two contacts P'1 and P'2 moved closer.

When it is detected that two contacts P1 and P2 on operation panel 34 have been made simultaneously, and further, the respective contacts have been continuously displaced from their initial positions linearly or substantially linearly, and both the contacts have been released almost simultaneously at two contacts P'1 and P'2 positioned at a spacing narrower than the spacing between their initial positions, CPU 30 detects that the "pinch-in" gesture has been performed.

Figure 7:
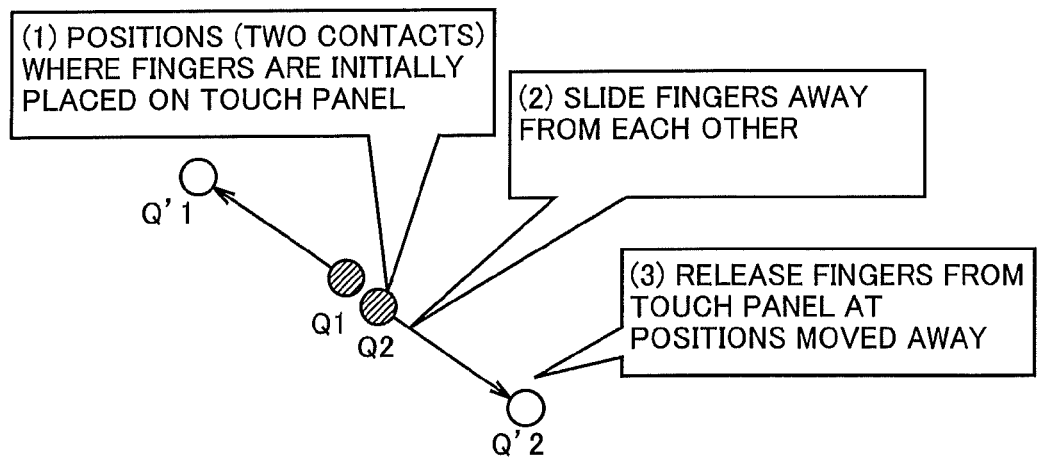
FIG. 7 illustrates a pinch-out gesture.

FIG. 7 illustrates a "pinch-out" gesture. Referring to FIG. 7, the "pinch-out" or anti-pinching gesture refers to a motion of making two contacts Q1 and Q2 on the operation panel using, for example, two fingers or the like, and then moving the fingers away from their initial positions linearly or substantially linearly, and releasing the two fingers from the operation panel at two contacts Q'1 and Q'2 moved away to some degree.

When it is detected that two contacts Q1 and Q2 on operation panel 34 have been made simultaneously, and further, the respective contacts have been continuously displaced from their initial positions linearly or substantially linearly, and both the contacts have been released almost simultaneously at two contacts Q'1 and Q'2 positioned at a spacing wider than the spacing between their initial positions, CPU 30 detects that the "pinch-out" or de-pinching gesture has been performed.

<Functional Configuration>

The functional configuration of each device for implementing the operations as described in the outline of operations in the image processing system according to the present embodiment will be described.

Figure 8:
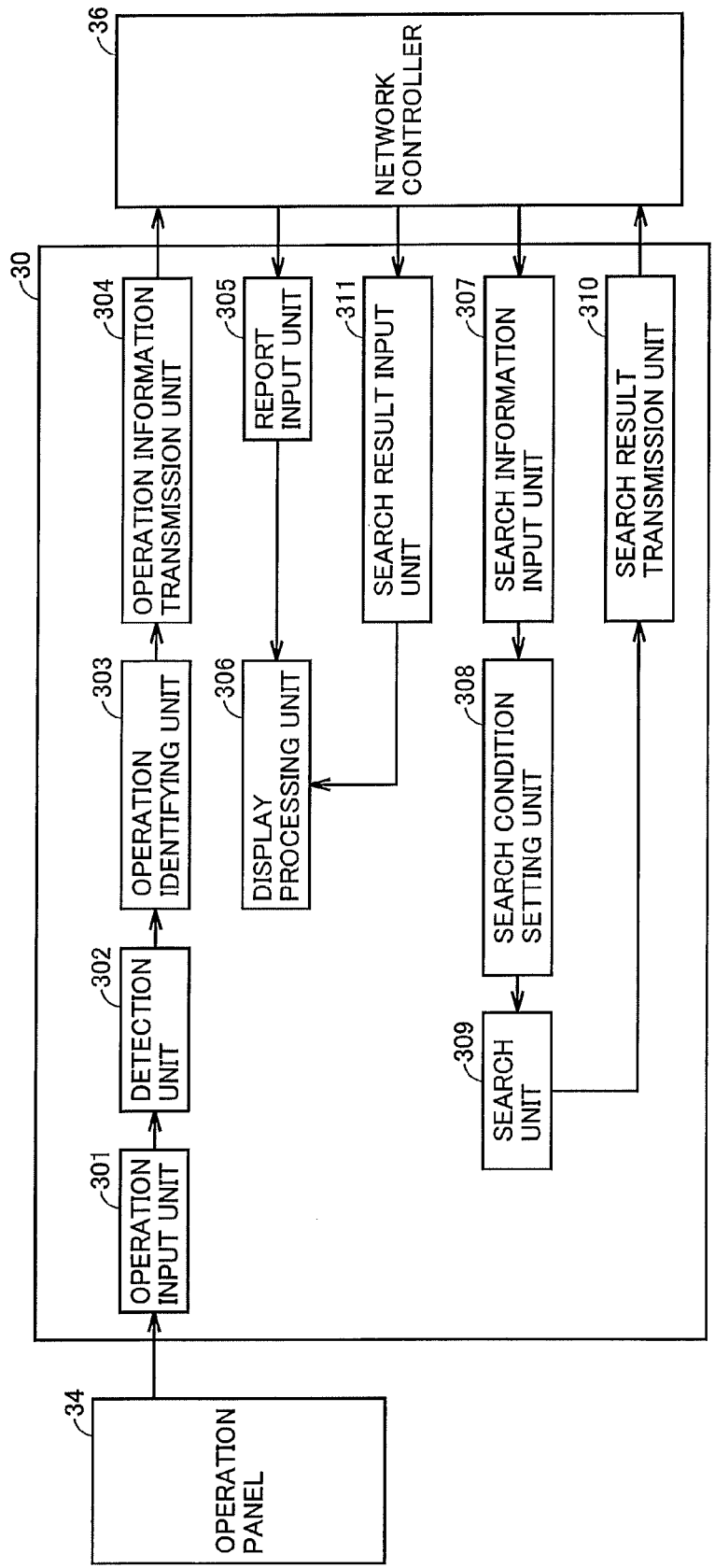
FIG. 8 is a block diagram showing a specific example of a functional configuration of the portable terminal.

FIG. 8 is a block diagram showing a specific example of a functional configuration of portable terminal 300. Each function shown in FIG. 8 is a function mainly configured in CPU 30 by CPU 30 reading a program stored in ROM 31 and executing the program on RAM 32. However, at least some functions may be configured by the hardware configuration shown in FIG. 3.

Referring to FIG. 8, as functions for achieving the above-described operations, portable terminal 300 includes an operation input unit 301 for receiving input of an operation signal indicating an instruction on operation panel 34, a detection unit 302 for detecting details of manipulation based on the operation signal, an operation information transmission unit 304 for identifying the information input by that operation, a file having been subjected to the operation and the like, and transmitting information based thereon as operation information to MFP 100 or another portable terminal 300 through network controller 36, a report input unit 305 for receiving a report on the authentication result in the above-described step S22 from MFP 100 through network controller 36, a search result input unit 311 for receiving a search result from portable terminal 300 through network controller 36, a display processing unit 306 for performing processing of displaying a screen in accordance with these on operation panel 34, a search information input unit 307 for receiving search information from MFP 100 through network controller 36, a search condition setting unit 308 for setting a search condition based on the search information, a search unit 309 for executing a search operation under the set search condition, and a search result transmission unit 310 for transmitting the search result to the other portable terminal 300 having transmitted the search information through network controller 36.

Operation identifying unit 303 identifies an icon, displayed in an area defined based on at least either two contacts (two contacts P1, P2 in FIG. 6) indicated initially in the pinch-in gesture or two contacts (two contacts P'1, P'2 in FIG. 6) indicated finally, as an icon indicated by the pinch-in gesture.

The method of identifying an icon indicated by the pinch-in gesture in operation identifying unit 303 is not limited to a certain method. FIGS. 9 to 13 each illustrate a specific example of a method of identifying an icon indicated by the pinch-in gesture in operation identifying unit 303.

Figure 9:
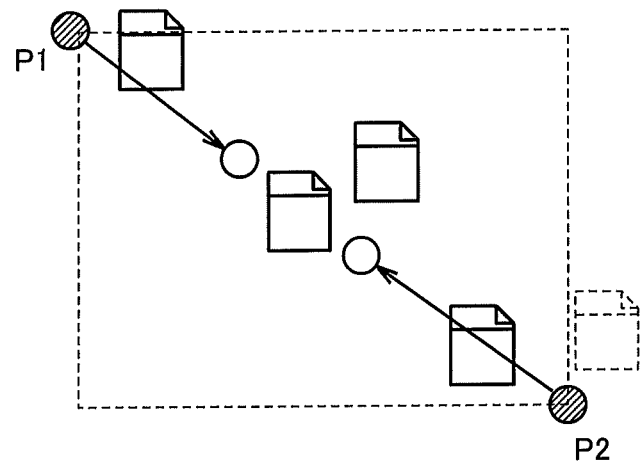
FIGS. 9 to 13 each illustrate a specific example of a method of identifying an icon indicated by the pinch-in gesture.
Figure 10:
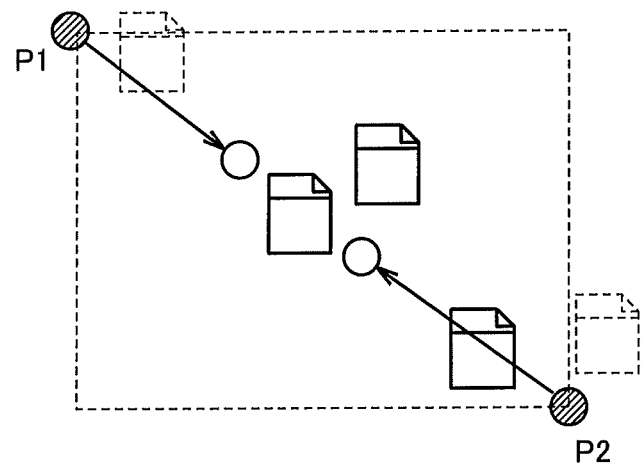

As an example, as shown in FIG. 9, operation identifying unit 303 may identify a rectangle in which two contacts P1 and P2 indicated initially are at opposite corners as an area defined by the pinch-in gesture, and may identify icons, each of which is at least partially included in that rectangle, may be identified as indicated icons. Alternatively, as shown in FIG. 10, a rectangle in which two contacts P1 and P2 indicated initially are at opposite corners may be identified as an area defined by the pinch-in gesture, and icons completely included in that rectangle may be identified as indicated icons. With such identification, the user can indicate an intended file by touching operation panel 34 with two fingers so as to sandwich an icon presenting a file to be transferred, and performing a motion for the pinch-in gesture from that state. The file to be transferred can thus be indicated in an intuitive manner. Even when an icon image is small, it can be indicated correctly.

Figure 11:
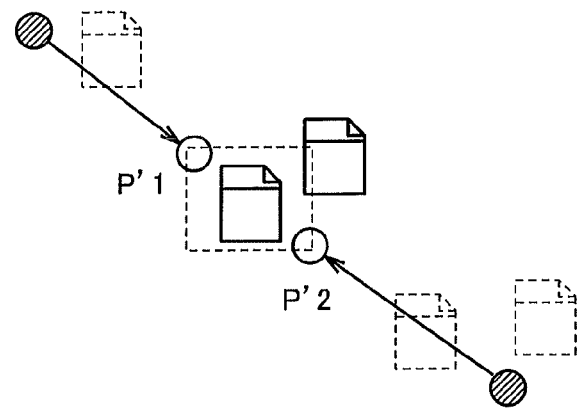
Figure 12:
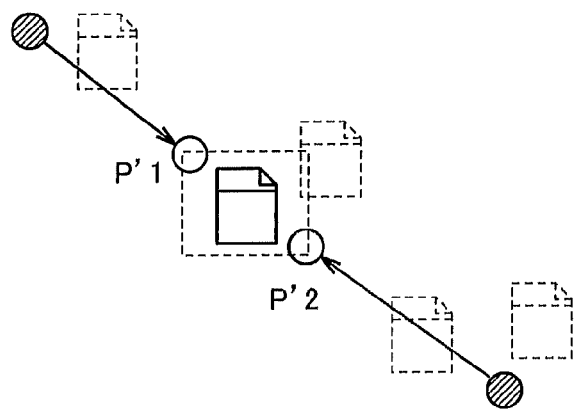

As another example, as shown in FIG. 11, operation identifying unit 303 may identify a rectangle in which two contacts P'1 and P'2 indicated finally are at opposite corners as an area defined by the pinch-in gesture, and may identify icons, each of which is at least partially included in that rectangle, may be identified as indicated icons. Alternatively, as shown in FIG. 12, a rectangle in which two contacts P'1 and P'2 indicated finally are at opposite corners may be identified as an area defined by the pinch-in gesture, and an icon completely included in that rectangle may be identified as an indicated icon. With such identification, the user can indicate an intended file by touching operation panel 34 with two fingers spaced apart, and then moving them closer to each other so that an icon presenting a file to be transferred is sandwiched finally between the two fingers. The file to be transferred can thus be indicated in an intuitive manner. Even when an icon image is small, it can be indicated correctly.

Figure 13:
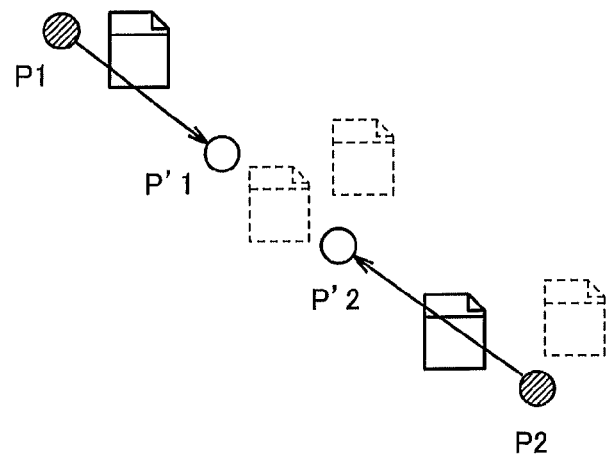

As still another example, as shown in FIG. 13, operation identifying unit 303 may identify two lines that connect two contacts P1, P2 indicated initially and two contacts P'1, P'2 indicated finally, respectively, as areas defined by the pinch-in gesture, and may identify icons where either one line overlaps as indicated icons. With such identification, the user can indicate an intended file by moving the two fingers so as to pinch in an icon presenting a file to be transferred. The file to be transferred can thus be indicated in an intuitive manner. Even when an icon image is small, it can be indicated correctly.

Operation identifying unit 303 identifies an icon, displayed in an area defined based on at least either two contacts (two contacts Q1, Q2 in FIG. 7) indicated initially in the pinch-out gesture or two contacts (two contacts Q'1, Q'2 in FIG. 7) indicated finally, as an icon indicated by the pinch-out gesture. The method of identifying an icon indicated by the pinch-out gesture in operation identifying unit 303 is not limited to a certain method. The method can include an identifying method similar to the identifying method in the pinch-in gesture described with reference to FIGS. 9 to 13.

Moreover, operation identifying unit 303 identifies the search condition input in accordance with the screen (FIG. 16) for entering a search condition based on an operation signal.

Operation information transmission unit 304 stores the user name, login information and the like of portable terminal 300 as user information on the user previously associated with that portable terminal 300. Then, when it is identified in operation identifying unit 303 that the operation signal results from a gesture of pinching in an icon presenting a file, and further, when it is identified that a subsequent operation signal results from a gesture of pinching out the icon indicating a search, the user information and the search condition are transmitted to MFP 100 as search information together with the file having been subjected to the pinch-in gesture.

When it is identified in operation identifying unit 303 that the operation signal results from a gesture for a login operation, operation information transmission unit 304 transmits user information on the login user to MFP 100 through network controller 36 as operation information.

When it is identified in operation identifying unit 303 that the operation signal results from a gesture of pinching in an icon permitting a search, operation information transmission unit 304 transmits a request for search information to MFP 100 through network controller 36 as operation information.

Search information input unit 307 receives input of a file and a search condition, as search information. For example, the search condition includes a search scope, a period of creating files to be searched for, and the like.

Search condition setting unit 308 sets a search keyword and a search condition based on this information. As an example of setting of a search keyword, the file name included in the search condition, a character string included in that file, or the like is set as a search keyword.

Search result transmission unit 310 transmits a search result, such as a file obtained by a search conducted in search unit 309 using the above-described set search keyword under the above-described set search condition, to another portable terminal identified by user information included in the search information received by search information input unit 307. The search result here refers to information that can identify a file or the like obtained by the search, rather than the file or the like itself.

Figure 14:
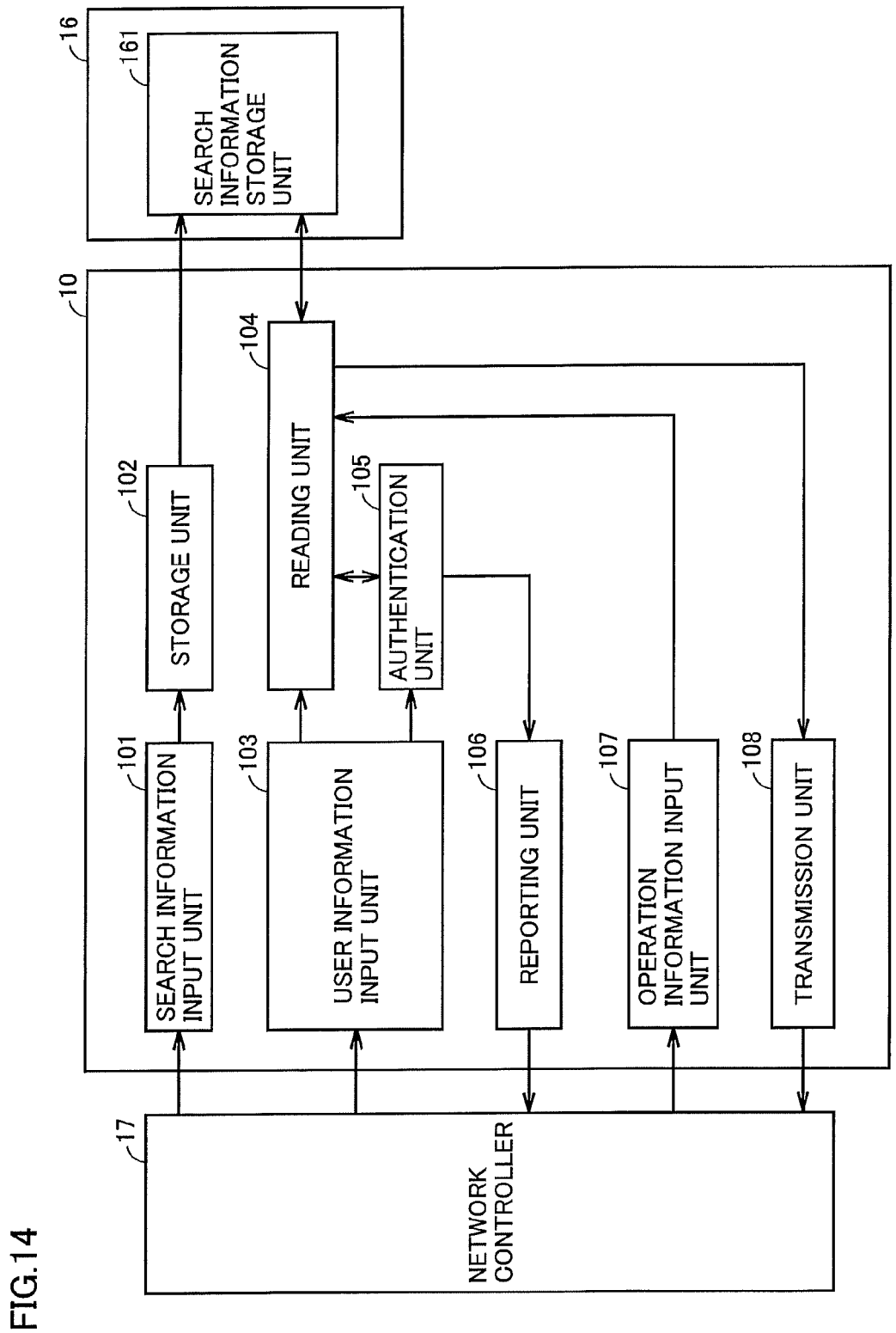
FIG. 14 is a block diagram showing a specific example of a functional configuration of MFP.

FIG. 14 is a block diagram showing a specific example of a functional configuration of MFP 100. Each function shown in FIG. 14 is a function mainly configured in CPU 10 by CPU 10 reading a program stored in ROM 11 and executing the program on RAM 12. However, at least some functions may be configured by the hardware configuration shown in FIG. 2.

Referring to FIG. 14, a search information storage unit 161 for storing transmitted search information is included in memory 16 of MFP 100.

As functions for achieving the above-described operations, MFP 100 further includes a search information input unit 101 for receiving search information transmitted from portable terminal 300 through network controller 17, a storage unit 102 for performing storage in search information storage unit 161 as an area of memory 16 for storing search information, a user information input unit 103 for receiving user information transmitted following the login operation in portable terminal 300, a reading unit 104 for reading necessary information from memory 16, an authentication unit 105 for authenticating user information included in search information read by reading unit 104 and/or user information input using the search condition, a reporting unit 106 for making a report on the authentication result to portable terminal 300 having transmitted the user information through network controller 17, an operation information input unit 107 for receiving a request for search information as operation information from portable terminal 300 having made the above-described report, and a transmission unit 108 for transmitting the file and the search condition in the search information read by reading unit 104 in response to that request, to portable terminal 300 having made that request through network controller 17.

Upon receipt of user information in user information input unit 103, reading unit 104 reads search information stored in search information storage unit 161. Here, when a plurality of pieces of search information are stored in search information storage unit 161, only the latest piece of search information may be read, or all the pieces of search information stored may be read.

Authentication unit 105 compares the user information received by user information input unit 103 with the user information included in the search information read from search information storage unit 161 by reading unit 104, and as an example, when they are in agreement, it is determined that authentication has succeeded. As another example, it may be determined that authentication has succeeded when user information received by user information input unit 103 shows a user set as a user permitted to search under the search condition included in the search information. This authentication result is reported by reporting unit 106 to portable terminal 300 in which the user information has been input.

Further, when operation information input unit 107 receives the request for search information from portable terminal 300 having made the above-described report as operation information, reading unit 104 reads the file and search condition included in the search information used for the above-described authentication from search information storage unit 161, in response to authentication success in authentication unit 105. The read information is transmitted by transmission unit 108 to portable terminal 300 having made the above-described request.

<First Flow of Operation in Portable Terminal>

Figure 15:
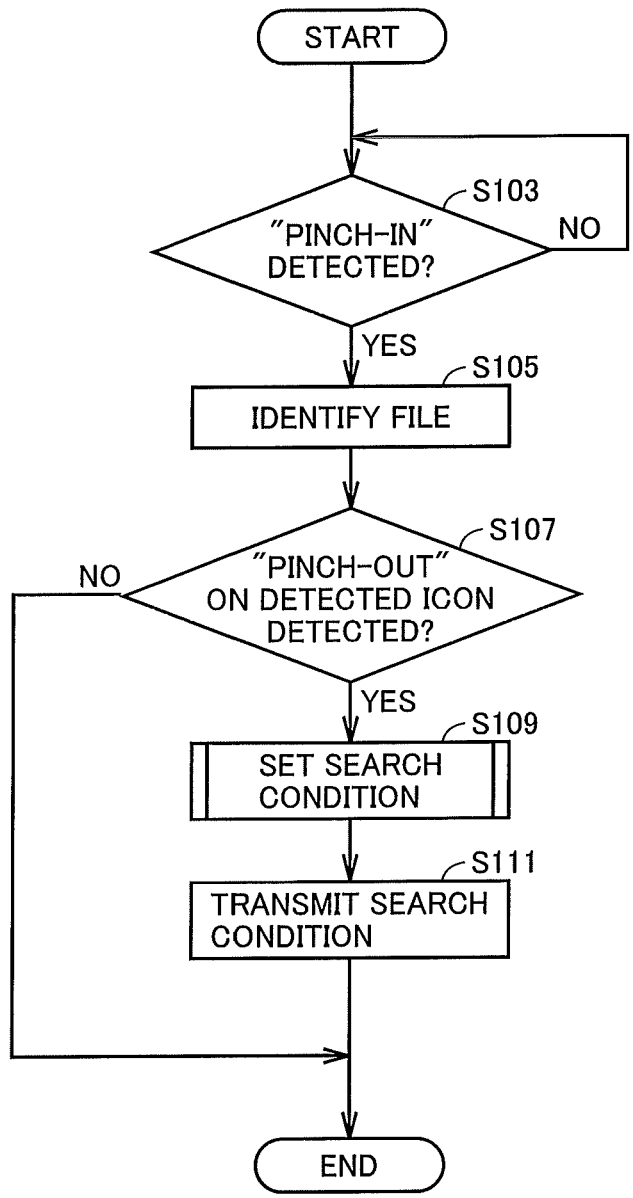
FIG. 15 is a flow chart showing a specific example of operations for instructing a search in the portable terminal.

FIG. 15 is a flow chart showing a specific example of operations for instructing a search in portable terminal 300A. The operations shown in the flow chart of FIG. 15 are implemented by CPU 30 reading a program stored in ROM 31 and executes the program on RAM 32.

Referring to FIG. 15, when it is detected that a pinch-in gesture has been performed on an icon presenting a file displayed on operation panel 34 (YES in Step S103), CPU 30 in Step S105 identifies a position on operation panel 34 where the pinch-in gesture has been performed, thereby identifying a file having been subjected to that gesture.

An icon not shown for initiating an application for instructing a search operation is displayed on operation panel 34. This icon is also called a launcher, for example.

When it is detected that a pinch-out gesture has been performed on the above-mentioned icon (launcher) after the pinch-in gesture detected in the above-described step S103 (YES in Step S107), CPU 30 sets a search condition in Step S109.

Figure 16:
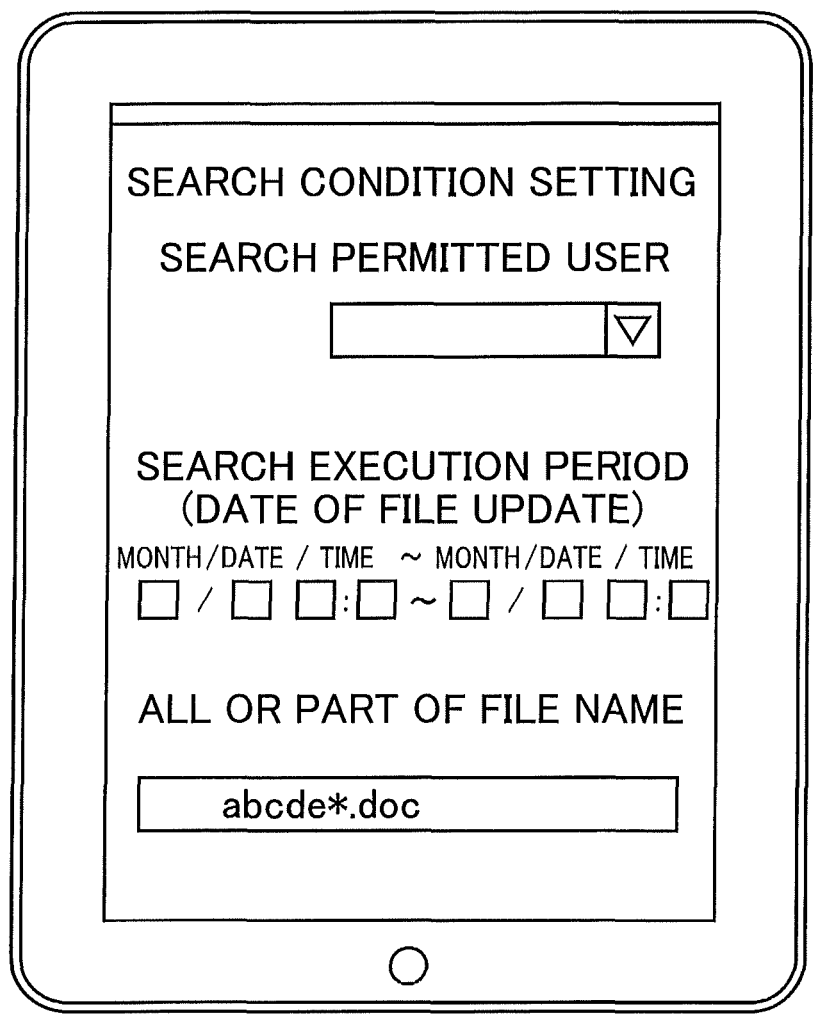
FIG. 16 shows a specific example of a display screen of the portable terminal for indicating a search condition.

As an example, in Step S109, CPU 30 causes operation panel 34 to display a screen as shown in FIG. 16, and accepts an operation on that screen, thereby setting the search condition. Description will be made here assuming a target of search as a file.

As another example, the search condition may be stored previously in a predetermined region of memory 33, and setting may be performed by CPU 30 reading the search condition in Step S109.

Further, the search condition may be stored in memory 33 for each user, and setting may be performed by CPU 30 reading the search condition relevant to a user having instructed a search based on login information or the like in Step S109.

In the example of FIG. 16, the file name of a file icon having been subjected to the pinch-out gesture on the launcher is automatically input to the box of "all or part of file name." Thus, the user does not need to make input through an input unit of a portable terminal which is somewhat difficult to use, and can substitute an intuitive gesture of "pinching in a file."

It is also possible to add "*" as a wild card (a special character representing an arbitrary character) to part of the file name having been input, as in the example of FIG. 16. Although indication of a user permitted to make a search (search permitted user) and a period of dates of updating a file subjected to the search (search execution period) shall be accepted in addition to the file name, another indication of a creator, for example, may be accepted.

Then, in Step S111, CPU 30 assumes the file identified in the above-described step S105 as a selected file, and transmits the search condition set in the above-described step S109 and user information on the user stored previously (e.g., a login user) having made that gesture, to MFP 100 as search information. The transmitted search information is stored in MFP 100.

It is noted that CPU 30 temporarily stores the file identified in the above-described step S105 in memory 33 or the like. At that time, when a pinch-out gesture on the icon for initiating the application for instructing a search operation is not detected within a predetermined period since the pinch-in gesture has been detected in the above-described step S103 (NO in step S107), CPU 30 preferably terminates a series of operations and deletes information on the identified file temporarily stored in the above-described step S105.

This eliminates the need to continue storing information that identifies a file when a pinch-out gesture is not performed on the above-described icon after the pinch-in gesture, so that the amount of storage of memory 33 will not be compressed.

<Flow of Operation in MFP>

Figure 17:
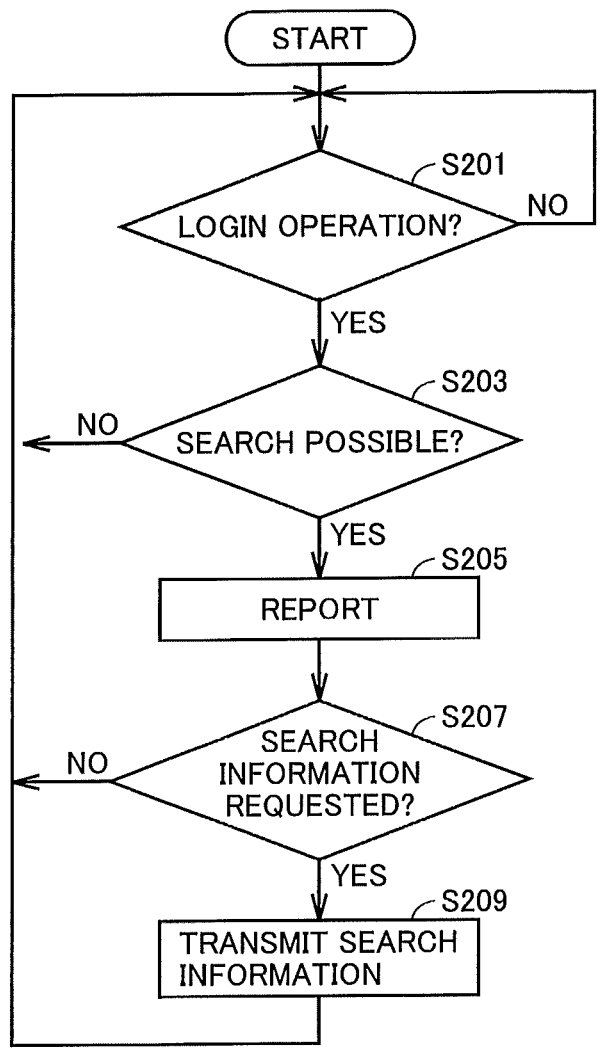
FIG. 17 is a flow chart showing a specific example of operations in MFP for identifying a file to be transferred.

FIG. 17 is a flow chart showing a specific example of operations in MFP 100 for identifying a file to be transferred. The operations shown in the flow chart of FIG. 17 are implemented by CPU 10 reading a program stored in ROM 11 and executing the program on RAM 12.

CPU 10 receives the search information transmitted from portable terminal 300A by the above-described operation, and temporarily stores the information in the predetermined region of memory 16.

Referring to FIG. 17, upon receipt of user information transmitted following a login operation from portable terminal 200B (YES in Step S201), CPU 10 compares that user information with the user information included in the search information stored, thereby authenticating the user. Further, user authentication may be conducted by checking whether or not the user presented by the user information is a user permitted to make a search under the search condition included in the search information stored.

As a result, when user authentication is successful, that is, when the user is permitted to make a search operation (YES in Step S203), CPU 10 in Step S205 makes a report on the authentication result to portable terminal 300B having transmitted the user information following the login operation in the above-described step S201.

Upon receipt of search information from portable terminal 300B having made the above-described report (YES in Step S207), CPU 10 in Step S209 reads search information for transmission to portable terminal 300B.

When there is no transmission of user information following the login operation from portable terminal 300B within a predetermined period after receiving the above-described search information from portable terminal 300A (NO in Step S201) or when the user authentication is not successful (NO in step S203), CPU 10 preferably deletes the search information temporarily stored in memory 16. An expiration time can thereby be set between a search instruction and execution of a search operation. In addition, memory 16 can be prevented from being compressed.

<Second Flow of Operation in Portable Terminal>

Figure 18:
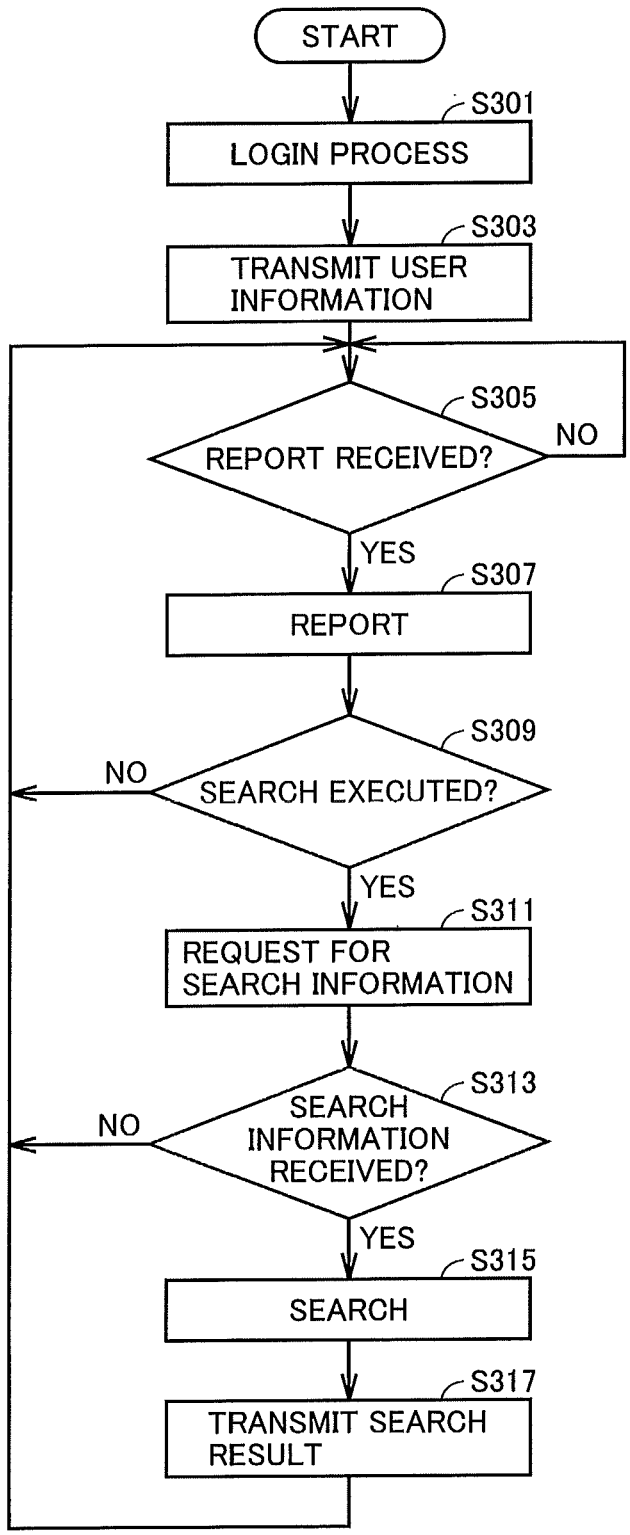
FIG. 18 is a flow chart showing a specific example of operations for instructing a search in the portable terminal.

FIG. 18 is a flow chart showing a specific example of operations for executing a search in portable terminal 300B. The operations shown in the flow chart of FIG. 18 are implemented by CPU 30 reading a program stored in ROM 31 and executes the program on RAM 32.

Referring to FIG. 18, CPU 30 executes a login process in Step S301 by receiving a login operation, and accordingly transmits in Step S303 user information on a login user to MFP 100.

Upon receipt of a report from MFP 100 that authentication on the user information is successful (YES in Step S305), CPU 30 in Step S307 causes operation panel 34 to display a report screen as shown in FIG. 19, for example, to report that there is search information on which authentication has succeeded.

Thereafter, when there is a manipulation of touching "OK" or the like in the above-described step S307 (YES in step S309), CPU 30 in Step S311 requests search information from MFP 100 assuming that a search execution has been instructed. Detection that the pinch-in gesture has been made on the report screen may be a search execution instruction.

Upon receipt of search information from MFP 100 in response to the above-described request (YES in Step S313), CPU 30 in Step S315 sets a search key based on a file included in that search information, sets the search condition included in that search information as a search condition in a search operation, and executes the search operation. Then, in Step S317, CPU 30 transmits the result to a portable terminal having transmitted the search information, based on the user information included in the search information. In this case, it is needless to say that transmission may be made through MFP 100, rather than direct transmission.

It is noted that CPU 30 temporarily stores the report from MFP 100 received in the above-described step S305 in memory 33 or the like. Then, based on that report stored temporarily, a report screen is displayed on operation panel 34 in Step S307. At that time, CPU 30 receives the report from MFP 100 and displays the report screen for a predetermined time, and when a pinch-in gesture is not detected in the meantime (NO in Step S309), may terminate a series of operations to wait for receipt of a report from MFP 100 and to delete a report stored previously. This eliminates the need to continue storing reports from MFP 100 when search start is not instructed by the user upon receipt of the reports from MFP 100, so that the amount of storage of memory 33 will not be compressed.

Effects of Embodiment

Accordingly, by making the above-described pinch-in and pinch-out gestures on another device through the network, a file can be indicated intuitively to cause a search operation to be executed.

Moreover, the load on the network can be reduced because only the search result is transmitted from a portable terminal having executed the search operation to a portable terminal having instructed the search, but information itself having been retrieved is not transmitted.

<Variation>

It is noted that, in the above example, the search condition for each user shall be indicated on portable terminal 300 and transmitted to MFP 100 as search information. However, as another example, the search condition for each user may be previously stored in MFP 100 functioning as a server.

Figure 20:
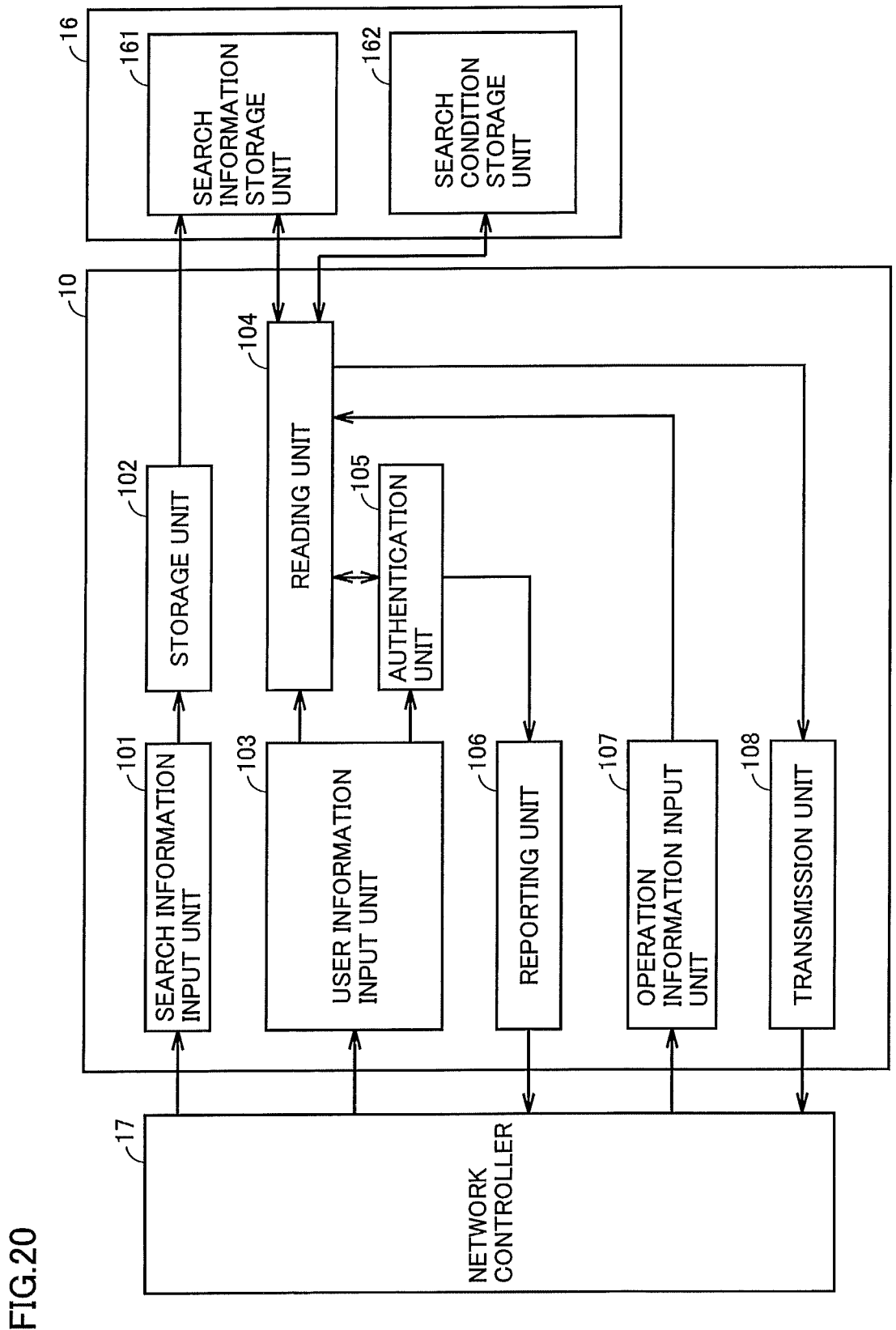
FIG. 20 shows a specific example of a functional configuration of MFP according to a variation.

FIG. 20 shows a specific example of a functional configuration of MFP 100 according to a variation.

Referring to FIG. 20, memory 16 of MFP 100 according to the variation includes a search condition storage unit 162 for previously storing the search condition for each user, in addition to search information storage unit 161 for storing transmitted search information.

Search condition storage unit 162 previously stores the search condition for each user. That is, search condition storage unit 162 stores the search condition including, for example, a search scope, a creation period of a file to be searched for and the like, for each user. This search condition may be set and changed by each user, or may be set and changed by a specific user, such as an administrator, based on a specific operation.

In this case, authentication unit 105 conducts authentication using user information transmitted from portable terminal 300A as search information and user information transmitted from portable terminal 300B following a login operation, and when authentication succeeds, reading unit 104 also reads, from memory 16, the search condition stored in association with the user presented by the user information included in the search information, and transmission unit 108 transmits the search condition to portable terminal 300B.

Then, it is unnecessary to indicate the search condition every time a search is instructed, and a user's convenience is improved. It is also unnecessary to transmit the search condition to MFP 100 every time a search is instructed from portable terminal 300A as search information, and the load on the network can thus be reduced further.

Other Examples

It is noted that, although the search condition is indicated on portable terminal 300A and a search is conducted for another portable terminal 300B in the above example, it is needless to say that the target of search is not necessarily restricted to a portable terminal.

Further, a program for causing the operations in MFP 100 and the operations in portable terminal 300 described above to be performed can also be offered. Such a program can be recorded on a computer-readable recording medium, such as a flexible disk attached to a computer, a CD-ROM (Compact Disk-Read Only Memory), a ROM (Read Only Memory), a RAM (Random Access Memory), a memory card, or the like, and can be offered as a program product. Alternatively, a program can be offered as recorded on a recording medium such as a hard disk built in a computer. Still alternatively, the program can also be offered by downloading through a network.

It is noted that the program according to the present invention may cause the process to be executed by invoking a necessary module among program modules offered as part of an operating system (OS) of a computer with a predetermined timing in a predetermined sequence. In that case, the program itself does not include the above-described module, but the process is executed in cooperation with the OS. Such a program not including a module may also be covered by the program according to the present invention.

Moreover, the program according to the present invention may be offered as incorporated into part of another program. Also in such a case, the program itself does not include the module included in the above-described other program, and the process is executed in cooperation with the other program. Such a program incorporated into another program may also be covered by the program according to the present invention.

An offered program product is installed in a program storage unit, such as a hard disk, and is executed. It is noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
    a plurality of terminal devices; and
    an image processing device, wherein
    a first terminal device among said plurality of terminal devices (i) includes a touch panel and a controller connected to said touch panel, (ii) receives a first gesture, including movement from two separate contact points on said touch panel, and a second gesture on said touch panel from a user of the first terminal device, (iii) indicates a file based on the first gesture on said touch panel, (iv) receives a search instruction by the second gesture on said touch panel, and (v) upon receipt of the search instruction by the second gesture on said touch panel, transmits, to said image processing device, search information including information corresponding to said file and user information associated with said user of the first terminal device,
    said image processing device stores said search information, and
    a second terminal device among said plurality of terminal devices (i) obtains, from said image processing device, a search condition and said search information including said file and said user information associated with said user of the first terminal device, (ii) sets the search condition in a search operation, (iii) executes the search operation using said search information, and (iv) transmits, to said first terminal device, based on said user information associated with said user of the first terminal device, a search result, said search result including information that identifies data retrieved by said search operation.

2. The image processing system according to claim 1, wherein
    said second terminal device transmits user information to said image processing device, and
    when user authentication based on the user information included in said search information from said first terminal device and the user information from said second terminal device succeeds, said image processing device transmits said search information to said second terminal device.

3. The image processing system according to claim 2, wherein when said user authentication succeeds within a predetermined period after receiving said search information from said first terminal device, said image processing device transmits said search information to said second terminal device.

4. The image processing system according to claim 2, wherein
  said image processing device makes a report on a result of said user authentication to said second terminal device,
  said second terminal device sends a request for said search information from said image processing device by receiving an operation of instructing execution of said search operation in accordance with said report, and
  said image processing device transmits said search information to said second terminal device in accordance with said request.

5. The image processing system according to claim 4, wherein when said request is received from said second terminal device within a predetermined period after receiving said search information from said first terminal device or after success in said user authentication, said image processing device transmits said search information to said second terminal device.

6. The image processing system according to claim 1, wherein said first terminal device sets the search condition, and said search condition is included in the search information transmitted from said first terminal device to said image processing device.

7. The image processing system according to claim 1, wherein said image processing device (1) stores a search condition for each user, and, in response to a request from said second terminal device, (2) transmits, to said second terminal device, (i) said search information from said first terminal device and (ii) a stored said search condition for said user of said first terminal based on said user information included in said search information received from said first terminal device.

8. The image processing system according to claim 1, wherein
  one of said first gesture and said second gesture on said touch panel is a gesture of, after two separate contact points are made on said touch panel, continuously moving said two separate contact points in a direction that a spacing therebetween is decreased and then releasing said two contacts after being moved, and
  the other one of said first gesture and said second gesture is a gesture of, after two separate contact points are made on said touch panel, continuously moving said two separate contact points in a direction that the spacing therebetween is increased and then releasing said two contacts after being moved.

9. An image processing device capable of communicating with a first terminal device and a second terminal device, comprising:
  a communication unit for communicating with said first terminal device and said second terminal device;
  a memory; and
  a controller, wherein
  said controller executes the processes of
    storing search information received from said first terminal device in said memory,
    conducting user authentication using user information received from said second terminal device and said search information,
    making a report on a result of said user authentication to said second terminal device;
    receiving a request for said search information from said second terminal device, said second terminal device having received an operation for execution of a search operation from a user of said second terminal; and
    transmitting said search information to said second terminal device in accordance with said request when said user authentication succeeds.

10. The image processing device according to claim 9, wherein
  said memory stores a search condition for each user,
  said search information includes user information indicated in said first terminal device, and
  in said process of transmitting said search information to said second terminal device, said controller transmits said search condition to said second terminal device in accordance with said user information included in said search information stored in said memory.

11. The image processing device according to claim 9, wherein when said user authentication succeeds within a predetermined period after receiving said search information from said first terminal device, said controller transmits said search information to said second terminal device.

12. The image processing device according to claim 9, wherein when said request is received from said second terminal device within a predetermined period after receiving said search information from said first terminal device or after success in said user authentication, said controller transmits said search information to said second terminal device.

13. A terminal device comprising:
  a touch panel; and
  a controller connected to said touch panel, wherein
  said touch panel receives, from a user of the terminal device, a first gesture, including movement from two separate contact points, and a second gesture on said touch panel from a user of the first terminal device, and
  said controller executes the processes of
    indicating a file based on the first gesture on said touch panel,
    upon receipt of a search instruction by the second gesture on said touch panel, transmitting, to another device, search information including at least information corresponding to said file and user information associated with said user of the terminal device,
    making a report to said other device when a predetermined gesture is performed on said touch panel, and
    executing a search operation using the search information received from said other device, and transmitting, as a search result, information that identifies data retrieved by said search operation to a device identified by said search information.

14. The terminal device according to claim 13, wherein
  one of said first gesture and said second gesture on said touch panel is a gesture of, after two separate contact points are made on said touch panel, continuously moving said two separate contact points in a direction that a spacing therebetween is decreased and then releasing said two separate contact points after being moved, and
  the other one of said first gesture and said second gesture is a gesture of, after two separate contact points are made on said touch panel, continuously moving said two separate contact points in a direction that the spacing therebetween is increased and then releasing said two contacts after being moved.

15. A non-transitory computer-readable storage medium having stored thereon a program for causing an image processing device having a controller to execute a control operation,
  said image processing device being capable of communicating with a first terminal device and a second terminal device, each including a touch panel, wherein said program instructs said controller to perform the following steps of:

conducting user authentication using user information received from said second terminal device and search information received from said first terminal device;

making a report on a result of said user authentication to said second terminal device;

receiving a request for said search information from said second terminal device, said second terminal device having received an operation for execution of a search operation from a user of said second terminal; and transmitting said search information to said second terminal device in accordance with said request when said user authentication succeeds.

\* \* \* \* \*